United States Patent [19]

Odawara

[11] Patent Number: 4,647,948

[45] Date of Patent: Mar. 3, 1987

[54] RADIATION-SENSITIVE RECORD UTILIZING AN ANNULAR RING AND PROJECTIONS ON THE DISC AS SPACERS BETWEEN TWO ADJACENT DISCS

[75] Inventor: Kazuharu Odawara, Yokohama, Japan

[73] Assignee: Kabushiki Kaisha Toshiba, Japan

[21] Appl. No.: 788,152

[22] Filed: Oct. 16, 1985

Related U.S. Application Data

[62] Division of Ser. No. 550,028, Nov. 8, 1983, Pat. No. 4,564,850.

[30] Foreign Application Priority Data

Nov. 10, 1982 [JP] Japan .................................. 57-197103

[51] Int. Cl.$^4$ ............................................ G01D 15/34
[52] U.S. Cl. ...................................... 346/137; 369/284
[58] Field of Search ................... 346/137, 135.1, 76 L; 369/283–288

[56] References Cited

U.S. PATENT DOCUMENTS

| | | | |
|---|---|---|---|
| 4,074,282 | 2/1978 | Balas | 346/137 X |
| 4,331,966 | 5/1982 | Moe | 346/137 |
| 4,443,806 | 4/1984 | Ando | 346/135.1 |
| 4,499,477 | 2/1985 | Davies | 346/137 |
| 4,555,716 | 11/1985 | Odawara | 346/137 |
| 4,556,968 | 12/1985 | Pelkey | 369/287 |
| 4,564,850 | 1/1986 | Odawara | 346/137 |

Primary Examiner—Joseph W. Hartary
Attorney, Agent, or Firm—Banner, Birch, McKie & Beckett

[57] ABSTRACT

A radiation-sensitive record disc is disclosed having a first disc and a second disc coaxially positioned adjacent the first disc to reinforce the first disc. A first spacer is positioned between the first and second discs for fixedly connecting the discs together and to form an air space between the discs. A recording layer is formed on one surface of the first or second discs within the air space. A second spacer is radially displaced from the first spacer, and positioned between the first and second discs. This second spacer enables the discs to move relative to each other in a radial direction in response to expansion or contraction of at least one of the discs due to changes in temperature, humiduty, atmospheric pressure, etc. In the preferred embodiment the first spacer comprises projections on the inner surface of the second disc, and the second spacer comprises an annular ring which slidably engages a projection on the outer peripheral surface of the second disc member.

5 Claims, 18 Drawing Figures

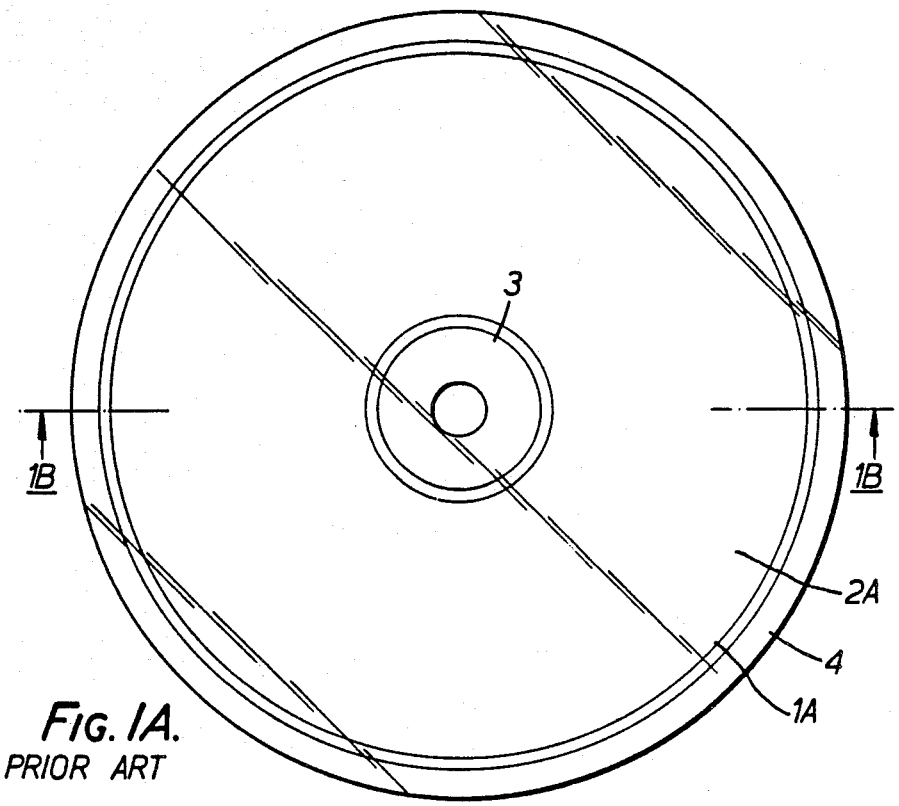
Fig. 1A.
PRIOR ART
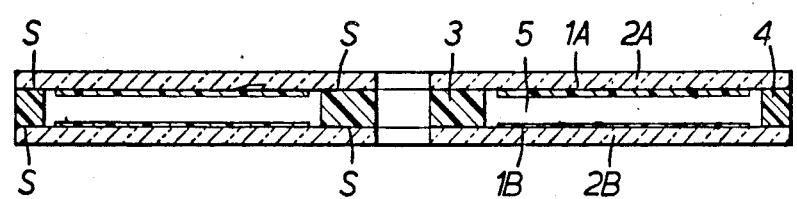
PRIOR ART Fig. 1B.
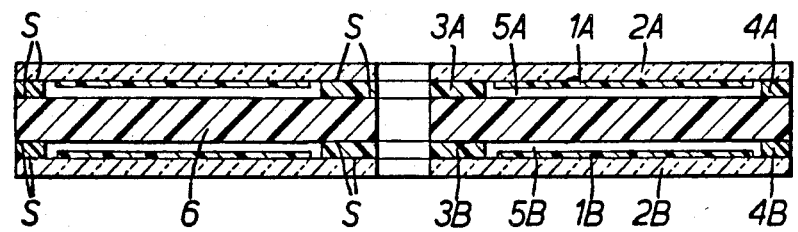
PRIOR ART Fig. 2.

RADIATION-SENSITIVE RECORD UTILIZING AN ANNULAR RING AND PROJECTIONS ON THE DISC AS SPACERS BETWEEN TWO ADJACENT DISCS

This application is a division of application Ser. No. 550,028, filed Nov. 8, 1983 now U.S. Pat. No. 4,564,850.

BACKGROUND OF THE INVENTION

This invention relates to a radiation-sensitive record disc, such as an optical disc or video disc, in which information recorded on a recording layer can be read by directing a light beam at the recording layer.

One conventional radiation-sensitive record disc employing a "sandwich" construction is shown in FIGS. 1A and 1B, which illustrate the disclosure in U.S. Pat. No. 4,074,282 issued to Balas et al. This record disc consists of two discs 2A and 2B, each of which may be formed of a transparent plastic plate. Optical information recording layers 1A and 1B, which consist of an energy-absorbing layer or a light reflective layer, are formed directly on one surface of each disc 2A, 2B. Discs 2A, 2B face each other so that recording layers 1A and 1B are positioned therebetween. Each disc 2A, 2B is bonded with adhesive agent S to concentric inner spacer 3 and concentric outer spacer 4 disposed therebetween to provide air space 5 between each recording layer 1A, 1B.

The discs of the above conventional record disc must be formed with a relatively small thickness since the recording/reading beam must pass through the discs without distortion. That is, the use of a disc having small thickness prevents beam energy loss and refraction of light as the beam passes through the disc. However, due to the disc's thickness and transparency requirements, the material used lacks stiffness. Thus, when the air or gas within the space between the discs expands or contracts as the surrounding heat or atmospheric pressure changes, the radiation-sensitive record disc bends or undulates in accordance with this expansion or contraction. Any resulting bending or undulation then causes defocusing of the reading/writing beam which produces inaccuracies in processing the information stored on the recording layers. In extreme cases, the record disc and the optical head will eventually contact each other thereby preventing any processing of the stored information.

The above difficulties led to the development of a radiation-sensitive record disc such as shown in FIG. 2. Reinforcing disc 6 having a rigidity at least equal to that of discs 2A and 2B is joined to discs 2A and 2B to strengthen the record disc. Concentric inner spacers 3A, 3B and concentric outer spacers 4A, 4B separate the discs and provide air spaces 5A and 5B in which recording layers are formed.

However, in the latter case, other difficulties arise because the properties of discs 2A, 2B and reinforcing disc 6 are different and dimensional differences occur. In response to temperature and/or humidity changes, expansion or contraction of discs 2A, 2B and reinforcing disc 6 tends to result in serious warping problems.

SUMMARY OF THE INVENTION

It is an object of the present invention to overcome the prior art disadvantages mentioned above by providing a radiation-sensitive record disc which will not bend or undulate due to changes in temperature and atmospheric pressure.

Another object of the present invention is to provide a radiation-sensitive record disc wherein data processing may be performed over a long period of time without information loss or without adversely affecting recording/reading integrity.

A further object of the present invention is to provide a radiation-sensitive record disc having high reliability and permitting accurate information processing.

The radiation-sensitive record disc according to the present invention includes a first disc and a second disc coaxially positioned adjacent the first disc to reinforce the first disc. A first spacer is positioned between the first and second discs for fixedly connecting the discs together to form air space between the discs. A recording layer is formed on one surface of the first or second discs in the air space between the discs. A second spacer is radially displaced from the first spacer and between the first and second discs for enabling the discs to move relative to each other in a radial direction in response to expansion or contraction of at least one of the discs due to temperature, humidity and atmospheric pressure changes. Thus, the radiation-sensitive record disc of the present invention will not bend or undulate despite exposure of the disc to increased temperature of the surrounding air or changes is atmospheric pressure. Accordingly, the record disc of this invention will perform data processing over a long period of time without information loss, while providing high realibility and accurate information processing.

BRIEF DESCRIPTION OF THE DRAWINGS

FIG. 1A is a plan view of the radiation-sensitive record disc of the prior art.

FIG. 1B is a vertical sectional view taken along line 1B—1B of the radiation-sensitive record disc shown in FIG. 1.

FIG. 2 is a vertical sectional view of another prior art record disc.

DETAILED DESCRIPTION OF THE PREFERRED EMBODIMENTS

Figure 3:
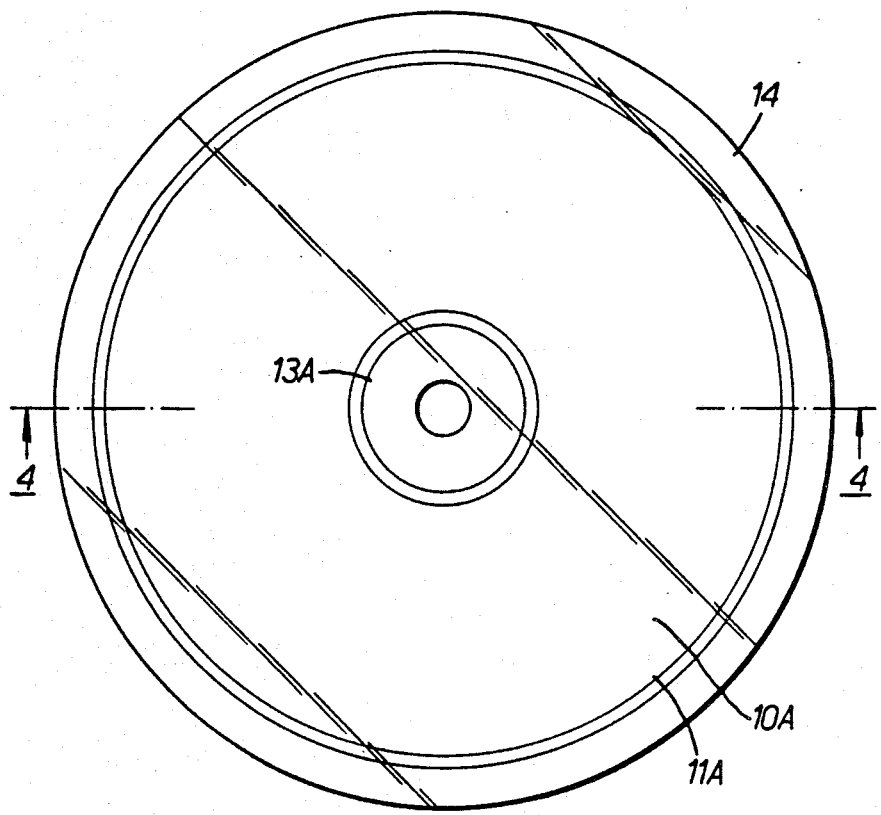
FIG. 3 is a plan view of the radiation-sensitive record disc of the present invention.
Figure 4:
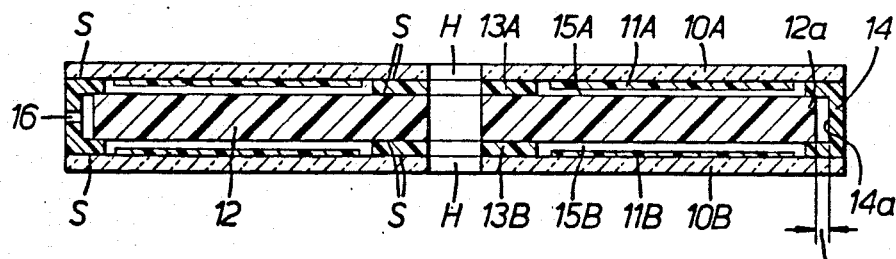
FIG. 4 is a vertical sectional view taken along line 4—4 of the radiation-sensitive record disc shown in FIG. 3.

Reference is now made to FIGS. 3 and 4.

A pair of discs 10A, 10B made of a transparent material such as acryl or glass are shown having a disc-like shape which may have a diameter of approximately 306 mm and a thickness of approximately 1.5 mm. Spindle holes H, which may have a diameter of 35 mm, are provided in the center of discs 10A, 10B. Annular recording layers 11A, 11B are formed on the surface of discs 10A, 10B, respectively. Recording layers 11A, 11B may be formed of Te or Al. Reinforcing disc 12, which is made of an acrylic material, metal, glass or ceramic, is positioned between discs 10A, 10B and has a disc-like shape having a diameter of approximately 298 mm and a thickness of 3 mm. The record disc is assembled in such a way that recording layers 11A, 11B face reinforcing disc 12. Air spaces are formed between recording layers 11A, 11B and the surface of reinforcing disc 12 by concentric inner spacers 13A, 13B and concentric outer spacer 14.

The two inner spacers 13A, 13B are bonded to discs 10A, 10B and reinforcing disc 12 by adhesive agent S. Outer spacer 14 is only bonded by adhesive agent S to the two discs 10A, 10B. Outer spacer 14 has groove 14a formed on its inside face. Outer rim 12a of reinforcing disc 12 is slidably inserted into this groove without bonding.

Reinforcing disc 12 performs the role of limiting warping of discs 10A, 10B since the rigidity of reinforcing disc 12 is greater than that of discs 10A, 10B. However, since reinforcing disc 12 has different properties than discs 10A, 10B, changes in the external environment produce dimensional differences between discs 10A, 10B and reinforcing disc 12, depending on differences in thermal expansivity, thermal capacity, expansivity due to moisture absorption and response rates of expansion. These dimensional differences are the greatest at the outer portions of discs 10A, 10B and reinforcing disc 12. When these dimensional differences occur, if the outer portions of discs 10A, 10B and reinforcing disc 12 are bonded by an adhesive agent, warping occurs. However, if discs 10A, 10B and reinforcing disc 12 are free to move at their outer periphery, as in the present invention, warping is prevented. Since the most significant dimensional change takes place in the radial direction, and is minimal in the transverse direction, it is sufficient to provide for relative movement of the outer periphery of discs 10A, 10B and reinforcing disc 12 in the radial direction.

In FIG. 4, vent hole 16 passes right through outer spacer 14 into groove 14a to prevent any pressure differential from arising between the inside and outside of groove 14a. The two end-faces of outer spacer 14 are bonded to discs 10A, 10B and groove 14a in outer spacer 14 is made only slightly larger than the thickness of outer rim 12a of reinforcing disc 12 so that no significant gap is formed. This outer spacer 14, as well as constituting a support for the outer portions of discs 10A, 10B, prevents the ingress of foreign matter such as minute dust particles into air spaces 15A, 15B.

Figure 5:
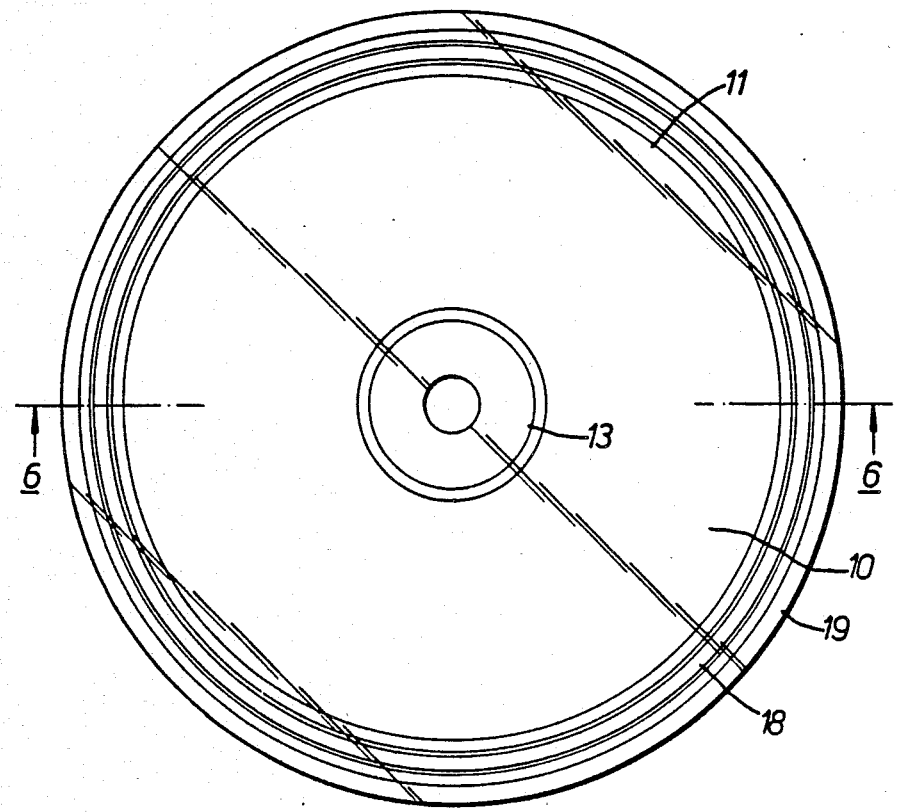
FIG. 5 is a plan view of the radiation-sensitive record disc of another embodiment of the present invention.
Figure 6:
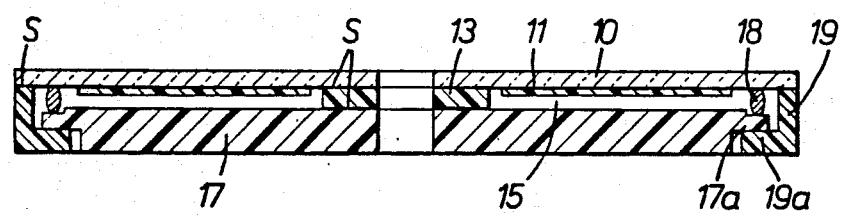
FIG. 6 is a vertical sectional view taken along line 6—6 of the radiation-sensitive record disc shown in FIG. 5.

The present invention is not limited to the embodiment described above. For example, it may be varied in the manner shown in FIGS. 5 and 6. Transparent disc 10, on which annular recording layer 11 is formed, and reinforcing disc 17 having rigidity similar to or greater than that of disc 10 are placed one over the other. Recording layer 11 of disc 10 is placed between the discs. Inner spacer 13 and annular ring 18, the latter of which is made of elastic material, support the spaced relationship of discs 10 and 17. Outer rim support member 19 is bonded to the outer rim of disc 10 by an adhesive agent, and annular projection 17a of reinforcing disc 17 is held in contact with portion 19a of this outer rim support member 19. Portion 19a which is in contact with the reinforcing disc and annular projection 17a of the reinforcing disc are not bonded together, but are free to slidably move in the radial direction. Outer rim support member 19 and annular ring 18 prevent the ingress of foreign particles.

Figure 7:
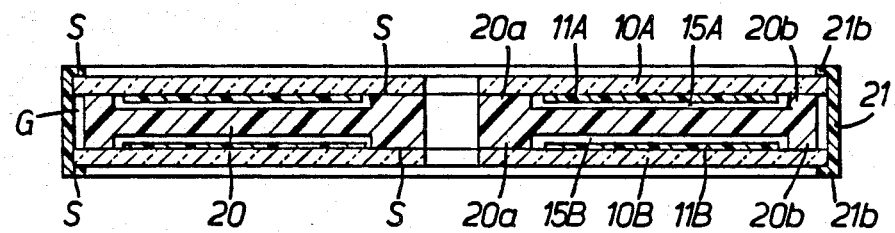
FIGS. 7-17 are vertical sectional views of the radiation-sensitive record disc of further embodiments of the present invention.

Other structures for accomplishing the objectives of the present invention are shown in FIGS. 7-17. In FIG. 7, inner annular projections 20a, which are provided on the inner periphery of reinforcing disc 20, constitute inner spacers. Outer annular projections 20b on the outer periphery of reinforcing disc 20 constitute outer spacers. The inner rims of discs 10A, 10B are bonded to inner annular projections 20a. The outer rims of discs 10A, 10B are held in contact with outer annular projections 20b. Annular outer rim support member 21 is provided which has a pair of brims 21b. Outer rim support member 21 surrounds the periphery of discs 10A, 10B and reinforcing disc 20, and brims 21b are bonded to the outer rims of discs 10A, 10B. Since the diameter of reinforcing disc 20 is slightly smaller than that of discs 10A, 10B, annular gap G exists between the periphery of reinforcing disc 20 and the inner surface of outer rim support member 21. Gap G of discs 10A, 10B permits movement in the radial direction relative to member 21 in response to contraction or expansion.

Figure 8:
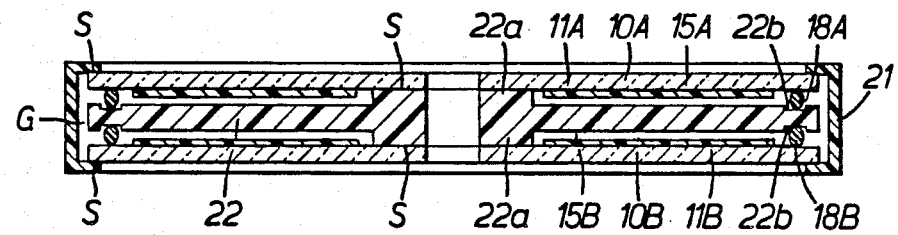

In FIG. 8, inner annular projections 22a, which are provided on the inner periphery of reinforcing disc 22, constitute inner spacers. A pair of annular rings 18A, 18B made of elastic material are placed between a pair of grooves 22b provided on opposite sides of the outer periphery of reinforcing disc 22 and discs 10A, 10B, respectively. These rings 18 are connected with reinforcing disc 22 and discs 10A, 10B by frictional force or a bonding agent.

Figure 9:
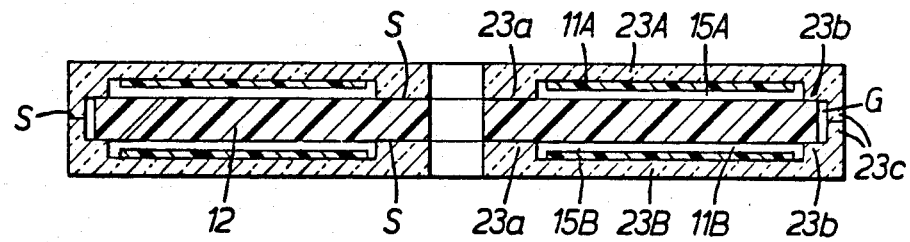

In FIG. 9, a pair of discs 23A, 23B are provided with inner annular projections 23a on the inner periphery thereof. These inner annular projections constitute inner spacers. Outer annular projections 23b on the outer periphery of discs 23A, 23B constitute outer spacers and frames 23c. Inner annular projections 23a are bonded with the inner rims of reinforcing disc 12. Frames 23c of discs 23A, 23B are bonded together. Since the diameter of reinforcing disc 12 is smaller than that of discs 23A, 23B, annular gap G exists between the periphery of reinforcing disc 12 and frames 23c. Gap G permits movement in the radial direction of discs 23A, 23B in response to contraction or expansion.

Figure 10:
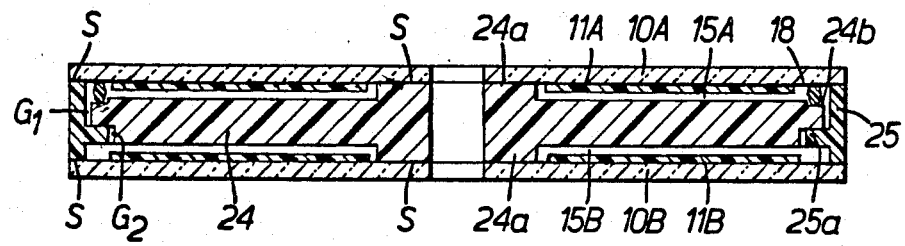

In FIG. 10, rib 25a projects from an inside surface of annular support member 25. Reinforcing disc 24 includes inner annular projections 24a on the inner periphery and outer annular projection 24b. The inner rims of discs 10A, 10B are bonded to inner annular projections 24a. The outer rims of discs 10A, 10B are bonded to the edges of annular support member 25. Outer annular projection 24b is held in contact with rib 25a by an elastic force provided by annular ring 18, which is made of elastic material and is positioned between the outer rim of disc 10A and annular projection 24B.

Figure 11:
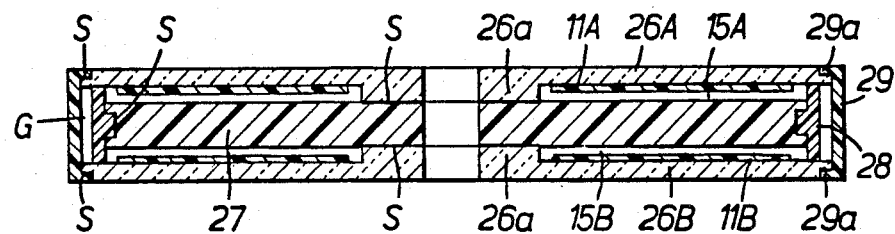

In FIG. 11, inner annular projections 26a are formed on the inner rim of discs 26A, 26B. These inner annular projections 26a are bonded to the inner periphery of reinforcing disc 27. An elastic annular belt 28 is bonded to the periphery of reinforcing disc 27 and extends between discs 26A, 26B to slidably engage the inner surface of discs 26A, 26B. A pair of brims 29a on annular connecting member 29 are bonded to the outer rims of discs 26A, 26B. Since the diameter of reinforcing disc 27 is smaller than that of discs 26A, 26B, annular gap G is formed between the periphery of elastic annular belt 28 and the inner surface of connecting member 29. Gap G permits the movement in the radial direction of discs 26A, 26B in response to contraction or expansion.

Figure 12:
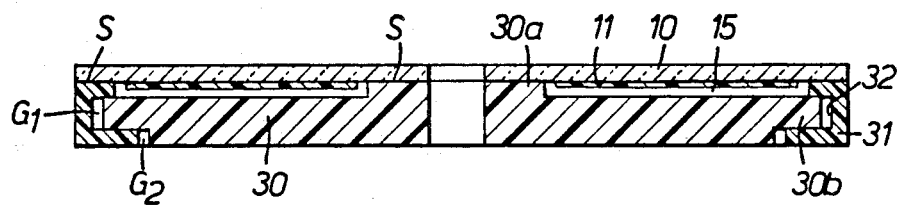

In FIG. 12, inner annular projection 30a on the inner rim of reinforcing substrate 30 constitutes an inner spacer and outer annular projection 30b is provided on the outer periphery of reinforcing disc 30. Outer spacer 31 includes groove 32. Annular projection 30b is slidably inserted in groove 32. The inner rim of disc 10 is bonded to inner annular projection 30a and the outer rim of disc 10 is bonded to outer spacer 31. Since the diameter of reinforcing disc 30 is smaller than that of disc 10, annular gap $G_1$, $G_2$ is formed between the periphery of reinforcing disc 30 and outer spacer 31. Gap $G_1$, $G_2$ permits movement in the radial direction of disc 10 and outer spacer 31 in response to contraction or expansion.

Figure 13:
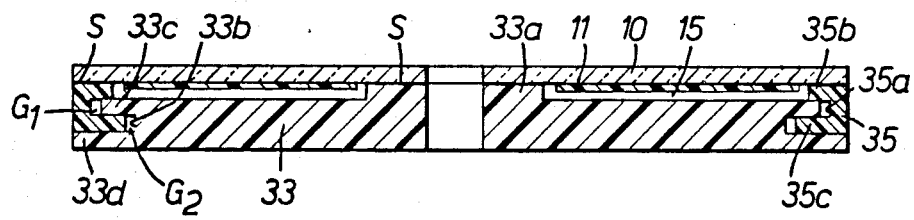

In FIG. 13, inner annular projection 33a on the inner rim of reinforcing disc 33 constitutes an inner spacer. First brim 33c and second brim 33d are provided on the outer periphery of reinforcing disc 33 and groove 33b is provided between first and second brims 33c, 33d. Outer spacer 35 includes third brim 35b, fourth brim 35c and groove 35a between third and fourth brims 35b, 35c. First brim 33c is slidably inserted in groove 35a of outer spacer 35 to form annular gap $G_1$. Fourth brim 35c is slidably inserted in groove 33b of reinforcing disc 33 to form annular gap $G_2$. These gaps $G_1$, $G_2$ permit movement in the radial direction of disc 10 and outer spacer 35 in response to contraction or expansion. The inner rim of disc 10 is bonded to inner annular projection 33a and the outer rim is bonded to outer spacer 35.

Figure 14:
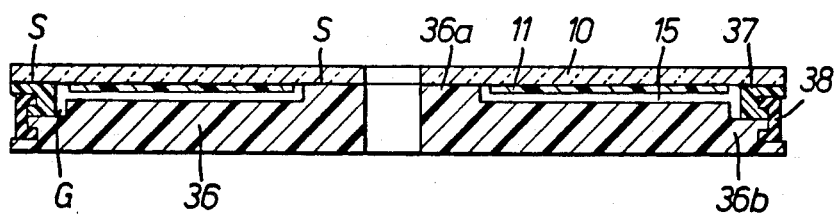

In FIG. 14, inner annular projection 36a on the inner rim of reinforcing disc 36 constitutes an inner spacer, and outer annular projection 36b is provided on the outer periphery of reinforcing disc 36. Outer spacer 37 is placed on annular projection 36b to form annular gap G. Annular elastic binder 38 connects outer spacer 37 and annular projection 36b of reinforcing disc 36. The inner rim of disc 10 is bonded to inner annular projection 36a and the outer rim is bonded to outer spacer 37. In response to expansion or contraction of disc 10, elastic binder 38 deforms and gap G permits disc 10 and outer spacer 37 to move in the radial direction.

Figure 15:
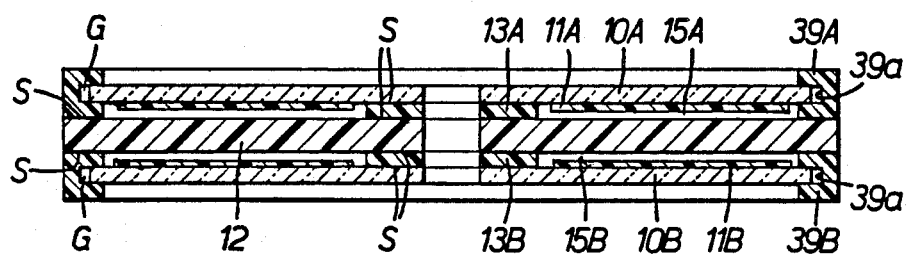

In FIG. 15, a pair of outer annular rings 39A, 39B having grooves 39a are bonded to the outer rims of both surfaces of reinforcing disc 12. The inner rim of the pair of discs 10A, 10B are bonded to the inner rim of reinforcing disc 12 through inner spacers 13A, 13B. The outer rim of the pair of discs 10A, 10B are slidably inserted into grooves 39a of outer annular rings 39A, 39B. Annular gap G is formed between the outer periphery of discs 10A, 10B and the inside surface of grooves 39a. Gap G permits movement in the radial direction of discs 10A, 10B in response to expansion or contraction.

Figure 16:
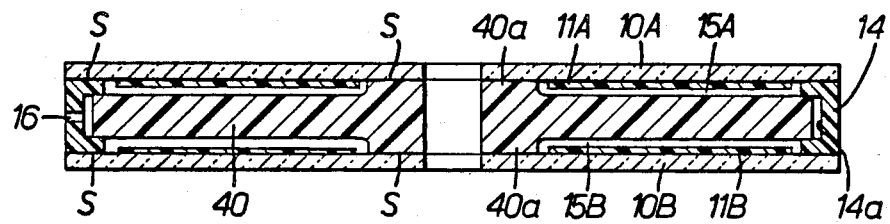

In FIG. 16, a pair of inner annular projections 40a integrally formed on the inner rim of reinforcing disc 40 constitute inner spacers. The remaining elements of this embodiment are the same as the embodiment shown in FIG. 4.

Figure 17:
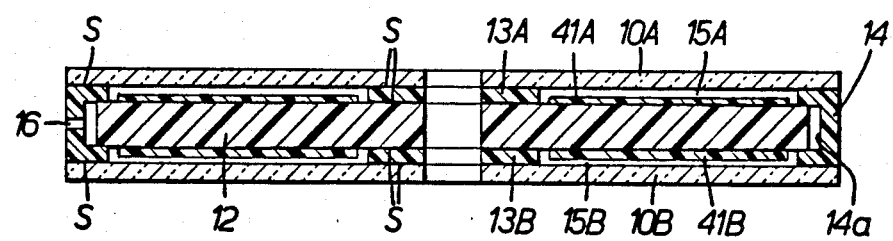

In FIG. 17, a pair of recording layers 41A, 41B are formed on the opposite surfaces of reinforcing disc 12 instead of on discs 10A, 10B. Other than this variation, the remaining elements of this embodiment are the same as the embodiment shown in FIG. 4.

Although illustrative embodiments of the invention have been described in detail with reference to the accompanying drawings, it is to be understood that the invention is not limited to those precise embodiments. Various changes may be effected therein by those skilled in the art without departing from the scope and spirit of this invention.

I claim:
1. A radiation-sensitive record disc comprising:
a first disc member;
a second disc member coaxially positioned adjacent said first disc member to reinforce said first disc member;
an annular projection on the outer peripheral surface of said second disc member;
first spacing means between said first and said second disc members for fixedly connecting said disc members together to form an air space between said disc members;
a recording layer formed on one surface of said first or second disc member in the air space between said disc members;
second spacing means radially displaced from said first spacing means and between said first and second disc members to form said air space, said second spacing means comprising an outer annular ring slidably engaging said projection for enabling said disc members to move relative to each other in a radial direction in response to expansion or contraction of at least one of said disc members.

2. The radiation-sensitive record disc of claim 1 wherein said second spacing means further comprises an outer elastic ring between said first disc member and one surface of said projection, said outer annular ring slidably engaging a surface of said projection opposite said one surface.

3. The radiation-sensitive record disc of claim 1 further comprising a third disc member coaxially positioned adjacent said second disc member on a side opposite said first disc member, third spacing means radially displaced from said second spacing means and between said second and third disc members for fixedly connecting said second and third disc members together to form a second air space and a recording layer formed on one surface of said second or third disc member in the second air space, said second spacing means further extending between said second and third disc members to form said second air space, said second spacing means slidably contacting at least one of said second or third disc member for enabling said second and third disc members to move relative to each other in a radial direction.

4. A radiation-sensitive record disc comprising:
a first disc member;
a second disc member coaxially positioned adjacent said first disc member to reinforce said first disc member;
a third disc member coaxially positioned adjacent said second disc member on a side opposite said first disc member;
first spacing means between said first and second disc members for fixedly connecting said disc members together to form a first air space between said disc members;
second spacing means radially displaced from said first spacing means and between said first and second disc members to form said air space, said second spacing means slidably contacting at least one of said first and second disc members for enabling said disc members to move relative to each other in a radial direction in response to expansion or contraction of at least one of said disc members;
third spacing means radially displaced from said second spacing means and between said second and third disc members for fixedly connecting said second and third disc members together to form a second air space;

a first recording layer formed on one surface of said first or second disc member in said first air space;

a second recording layer formed on one surface of said first or second disc member in said second air space;

wherein said second spacing means further extends between said second and third disc members to form said second air space, said second spacing means slidably contacting at least one of said second and third disc members for enabling said second and third disc members to move relative to each other in a radial direction;

wherein said first and third spacing means comprise a pair of concentric inner annular spacers between said second disc members and each of said first and third disc members; respectively; and wherein said concentric inner annular spacers comprise projections on the inner periphery of both surfaces of said second disc member.

5. The radiation-sensitive record disc of claim 4 wherein said second spacing means comprises outer annular projections on opposite sides of said second disc member which abut against said first and third disc members, respectively.

* * * * *